May 29, 1928.

B. B. KAHN

COOKING STOVE

Filed Feb. 2, 1924

Inventor

Bertrand B. Kahn

By

Attorney

Patented May 29, 1928.

1,671,192

UNITED STATES PATENT OFFICE.

BERTRAND B. KAHN, OF CINCINNATI, OHIO, ASSIGNOR TO THE ESTATE STOVE COMPANY, OF HAMILTON, OHIO, A CORPORATION OF OHIO.

COOKING STOVE.

Application filed February 2, 1924. Serial No. 690,226.

This invention relates to cooking stoves, and one of the principal objects of the invention is to provide an improved form of stove top which is provided with means for catching liquids and the like, which may spill upon the top of the stove, to prevent such liquids running onto the floor or into the heating units, and is so constructed that the collected liquids may be readily removed.

Another object and advantage of the invention is to provide an improved form of cooking top which simplifies the work of cooking.

Other objects and advantages of the invention will be apparent from the description thereof set out below, when taken in connection with the accompanying drawing.

Figure 1:
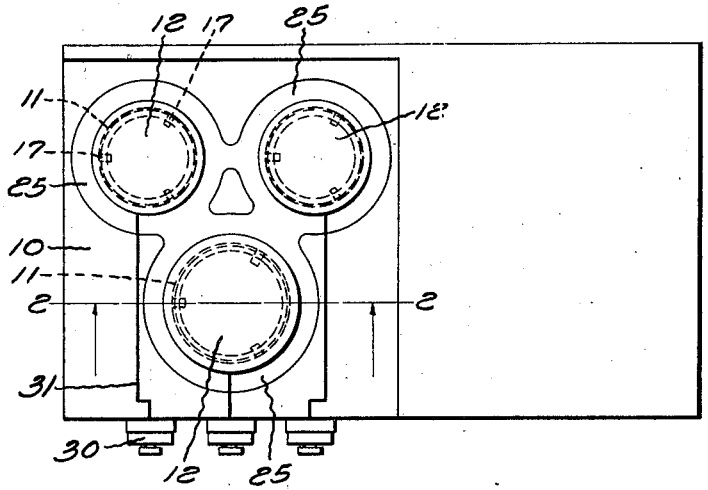
Figure 2:
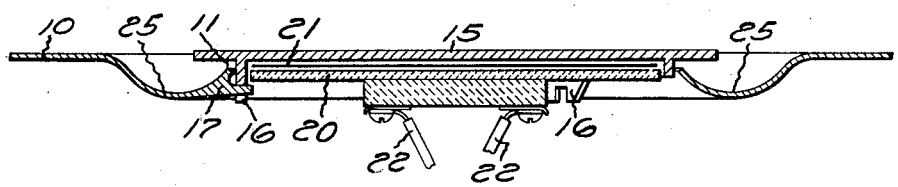

In the drawing in which like characters of reference designate like parts throughout the several views thereof, Fig. 1 is a plan view of a stove having a cooking top constructed in accordance with this invention; and Fig. 2 is a vertical sectional view through the stove illustrated in Fig. 1, the section being along the line 2—2 of Fig. 1.

As showing a preferred embodiment the invention is illustrated herein as embodied in an electric cooking stove; but it is to be understood that it is generally applicable to stoves of any other type.

One of the most serious objections to electric cooking stoves, as heretofore constructed, has been that the heating units were of such character that liquid, or other material, spilled upon the top of the stove would tend to accumulate upon the heating units. It has been the practically universal experience with electric stoves that when a pan boils over part of the liquid boiling over the side of the cooking vessel tends to flow down into the heating units. It is particularly noticeable that greasy substances tend to accumulate in these heating units, which is quite objectionable. This is objectionable because such accumulations tend to interfere with the efficient operation of the heating elements; but is much more objectionable because disagreeable odors result due to the vaporizing of this material which has accumulated within the heating units.

Not only is this objection present in electric cooking stoves, but it is also present in gas stoves. And it is not an uncommon occurrence to have some of the material which boils over during cooking flow down into the burners of the gas stove and clog the openings in the burners, so as to seriously interfere with effective operation of the stove.

Also under such circumstances some of the liquid which boils over, or other liquid spilled on the top of the stove, frequently runs over onto the floor and makes an objectionable mess.

In the form of stove shown in the drawing as illustrating an embodiment of this invention, the cooking top 10, as is the usual practice is provided with openings 11 each of which is adapted to receive one of the heating units, designated usually by the numeral 12.

Preferably each of these heating units consists of a circular thin metal disc or plate 15, having depending legs 16, there being preferably three of these legs 16 associated with each plate, as shown in dotted lines in Fig. 1. Each of these legs is cut out at its lower end or bifurcated, as shown in Fig. 2 to receive or straddle a supporting projection or lug 17, carried by the cooking top, and extending into the opening for the heating unit. Associated with the plate 15 is a plate or member 20 of refractory material, the heating elements, as illustrated diagrammatically by 21 being positioned between the plate 15 and the refractory member 20. Suitable conductors 22, connect these heating elements to a source of electrical energy, in the usual manner.

The cooking top 10 is formed to provide a groove 25, surrounding each of the openings 11, these grooves being formed in the top in any desired way. In the construction shown in the drawing the top is made as a thin casting, the grooves being cast into the top. The plate 15 is of greater diameter than its cooperating opening 11 so that it overhangs the edge of the opening 11, and its associate groove, as clearly shown in Fig. 2. As a result of this construction liquid spilled upon the top of the stove, from boiling over of a cooking vessel, or in any other way, will run into the grooves 25 and will be caught therein, and thus prevented from running onto the floor, or into the heating units.

Preferably the grooves surrounding two or more openings 11 are interconnected to increase the capacity of the grooves. In the form of stove illustrated in Fig. 1, in which the cooking top is provided with three heating units, the several grooves surrounding the three openings are interconnected, with grooves surrounding two adjacent openings interconnected, giving an appearance somewhat in the nature of a clover-leaf, so that a considerable quantity of material may be caught within these grooves. The particular manner in which the grooves are interconnected is immaterial so far as the particular functioning of the grooves is concerned; but in order to add to the attractive appearance of the stove the grooves in a stove having three heating units are preferably connected in the manner shown. Where the stove is provided with four heating units the grooves are preferably connected in two pairs, each pair comprising one front and one back opening, as this arrangement has also been found to give an attractive appearance to such a cooking top.

It is evident that with grooves such as shown in the drawing any material which is caught in them may be readily removed, by wiping the grooves out with a wash cloth, or in any other suitable manner.

As shown in Fig. 1 control switches 30 are located at the front of the cooking top, or some adjacent part of the stove, in conventional fashion. It is the usual practice to indicate by words associated with each switch which of the heating units each such switch controls. In the form of stove illustrated herein, however, the stove top is provided with arrows or lead lines 31, formed permanently in the stove top, as by casting small grooves therein, and each arrow or lead line connects a cooperating switch and heating unit, so that the operator of the stove can tell at a glance, and without any likelihood of mistakes just which switch controls each heating unit. Of course this same method of indicating is applicable to gas stoves, oil stoves, and the like.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. An electric cooking stove comprising, in combination, a cooking top having an opening therein adapted to receive a heating unit, supporting lugs carried by the said top and extending into said opening; a heating unit of comparatively small heat capacity positioned within said opening, comprising a comparatively flat metallic plate upon which the cooking vessel is adapted to set, and downwardly extending legs of relatively small cross-section carried by said plate and cooperating with the said supporting lugs to support said heating unit in position.

2. An electric cookstove comprising, in combination, a cooking top having an opening therein adapted to receive a heating unit, supporting lugs carried by said top and extending into the said opening, a large capacity groove in said top surrounding the said opening; and a heating unit positioned within said opening, comprising an imperforate metallic plate upon which the cooking vessel is set, said plate being of such size as to overhang the groove on all sides of the said opening, and depending legs carried by the said plate and adapted to cooperate with the supporting lugs to support the heating unit in position, the construction being such that any liquid, or the like, which boils over from the cooking vessel will be caught by the said groove and prevented from running onto the floor or into the heating unit.

3. An electric stove, of the character described, comprising, in combination, a cooking top having an opening therein adapted to receive a heating unit, a large capacity groove in said top surrounding said opening; and an electrical heating unit supported within said opening including an imperforate heating plate adapted to receive a cooking vessel thereon, said plate overhanging the said groove, the construction being such that any liquid spilled upon the top of the stove and heating plate will be caught by the said groove and prevented from running into the heating unit.

4. A cook-stove of the character described, comprising a cooking top having a plurality of openings therein, each adapted to receive a heating unit, said cooking top having large capacity grooves formed therein around said openings, said grooves communicating with one another at their adjacent portions to provide a large capacity catch basin for catching and retaining liquids or the like spilled upon the cooking top.

5. An electric cooking stove comprising, in combination, a cooking top having an opening therein adapted to receive a heating unit, said top having a large capacity groove therein surrounding said opening, an electrical heating unit of comparatively small heat capacity supported within said opening including an imperforate comparatively flat metallic heating plate adapted to receive a heating vessel thereon, and means for supporting said heating unit with comparatively small heat conducting contact between said heating unit and said cooking top and with said heating plate above and overhanging said groove in the cooking top, the construction being such that any liquid spilled upon the top of the stove and heating plate will be caught by the said groove and prevented from running into the heating unit.

6. An electric cooking stove comprising a cooking top having a plurality of openings therein, each adapted to receive a heating unit, large capacity grooves in said top surrounding said openings, an electrical heating unit supported within each opening including an imperforate heating plate adapted to receive thereon the cooking vessel, said plate being of such size and so supported as to overhang the groove on all sides of its respective opening in the stove top, said stove top having depressions formed therein between adjacent grooves for interconnecting the grooves associated with adjacent openings, said grooves and depressions forming a large capacity catch basin adapted to retain spilled material therein, the construction being such that any liquid or other material spilled upon the stove top and heating plates will be collected in the said catch basin and prevented from running into the heating units or onto the floor.

In testimony whereof I hereto affix my signature.

BERTRAND B. KAHN.